US007124062B2

(12) United States Patent
Gebhart

(10) Patent No.: US 7,124,062 B2
(45) Date of Patent: Oct. 17, 2006

(54) SERVICES SEARCH METHOD

(75) Inventor: Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 10/749,754

(22) Filed: Dec. 30, 2003

(65) Prior Publication Data
US 2005/0149294 A1 Jul. 7, 2005

(51) Int. Cl.
*G06F 11/30* (2006.01)
(52) U.S. Cl. ............... 702/186; 702/179; 702/180; 709/200
(58) Field of Classification Search ............... 702/179, 702/180, 182, 183–188; 709/1, 106, 200; 707/1, 6, 100, 101; 713/200, 201
See application file for complete search history.

(56) References Cited

U.S. PATENT DOCUMENTS

| 5,440,722 A * | 8/1995 | VanderSpek et al. ......... 714/43 |
| 6,256,740 B1 * | 7/2001 | Muller et al. ............... 713/201 |
| 6,826,568 B1 * | 11/2004 | Bernstein et al. .............. 707/6 |

* cited by examiner

*Primary Examiner*—Bryan Bui
(74) *Attorney, Agent, or Firm*—Finnegan, Henderson, Farabow, Garrett & Dunner, LLP

(57) ABSTRACT

A method that includes, in a network, in each of a plurality of compute nodes, maintaining a local store of services, the local store of services including at least a service name, a service functionality and statistics defining a historical performance of the service on each compute node, receiving a request for a service from a client syste, and compiling a list of compute nodes matching the service request, the list having service names ranked according to the service functionality and the statistics for each compute node.

26 Claims, 4 Drawing Sheets

SERVICES SEARCH METHOD

TECHNICAL FIELD

This invention relates to services search methods.

BACKGROUND

Web services (sometimes called application services) are services that usually include some combination of programming and data, but possibly including human resources as well. These services are made available from a business's web server for web users or other web-connected programs. Providers of web services are generally known as application service providers. Web services range from such major services as storage management and customer relationship management (CRM) down to much more limited services such as the furnishing of a stock quote and the checking of bids for an auction item.

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of virtual organizations for applications and data sharing.

SUMMARY

In one aspect, the invention features a method that includes, in a network, in each of a plurality of compute nodes, maintaining a local store of services, the local store of services including at least a service name, a service functionality and statistics defining a historical performance of the service on each compute node, receiving a request for a service from a client syste, and compiling a list of compute nodes matching the service request, the list having service names ranked according to the service functionality and the statistics for each compute node.

Embodiments may include one or more of the following. The statistics include a number representing times the service has been instantiated. The statistics include a number representing, for each instantiation of the service, how long the service was used until the service was destroyed. The statistics include a number representing a service response time. The statistics include a number representing an average availability statistic. The statistics include a service version number. The statistics include a cost for a service. The statistics include a number representing times the service had errors. The statistics include the following: a number representing times the service has been instantiated, a number representing, for each instantiation of the service, how long the service was used until the service was destroyed, a number representing a service response time, a number representing an average availability statistic, a number representing times the service has errors, and a service version number.

Embodiments may further include one or more of the following. The method further includes displaying the list on the client system. In some cases, displaying includes a graphical user interface (GUI). The list is ranked according to a frequency of service instantiation. The list is ranked according to an average service response time. The list of ranked according to a frequency of error.

In another aspect, the invention features a computer program product, tangibly embodied in an information carrier, for service searching, the computer program product being operable to cause data processing apparatus to do the following. In a network, in each of a plurality of compute nodes, maintain a local store of services, the local store of services including at least a service name, a service functionality and statistics defining the historical performance of the service on each compute node. Receive a request for a service from a client system. Compile a list of compute nodes matching the service request, the list having service names ranked according to the statistics.

Embodiments may include one or more of the following. The statistics include a number representing times the service has been instantiated, a number representing a service response time, a number representing an average availability statistic, and a service version number. The list is ranked according to a frequency of service instantiation. The list is ranked according to an average service response time. The list is ranked according to cost.

In another aspect, the invention features a system that includes a client system residing in a network, a plurality of compute nodes in the network, each one of the compute nodes maintaining a local store of services, the local store of services including at least a service name, a service functionality and statistics defining the historical performance of the service on each compute node. The system also includes means for receiving a request for a service from a client system, and means for compiling a list of compute nodes matching the service request, the list having service names ranked according to the statistics.

Embodiments may include one or more of the following. The statistics include a number representing times the service has been instantiated, a number representing a service response time, a number representing an average availability statistic, and a service version number. The list is ranked according to a frequency of service instantiation. The list is ranked according to an average service response time.

In another aspect, the invention features a method that includes generating a store of installed services in a computing device, the store including service names, a service functionalities and statistics defining the historical performance of the service on the computing device, the statistics comprising a number representing times the service has been instantiated, a number representing a service response time, a number representing an average availability statistic and a service version number. The method also includes updating the statistics in response to a change in the number of service instantiations, a change in service response time, a change in service availability or a change in the service version number.

Embodiments may include one or more of the following. The method further includes providing remote access to the store. The statistics further include a cost.

Embodiments of the invention may have one or more of the following advantages. A client can search for a service from of a grouping of similar services based on a measured usage history of the service. The measured usage history of a given service can indicate how well the service performs. This service can be a web service or a middleware service provided by a grid computing environment. In the case of grid computing environments with transient services, a client can search for a resource to instantiate the service from a grouping of similar resources based on the measured usage history of instantiations of the service on the resource.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
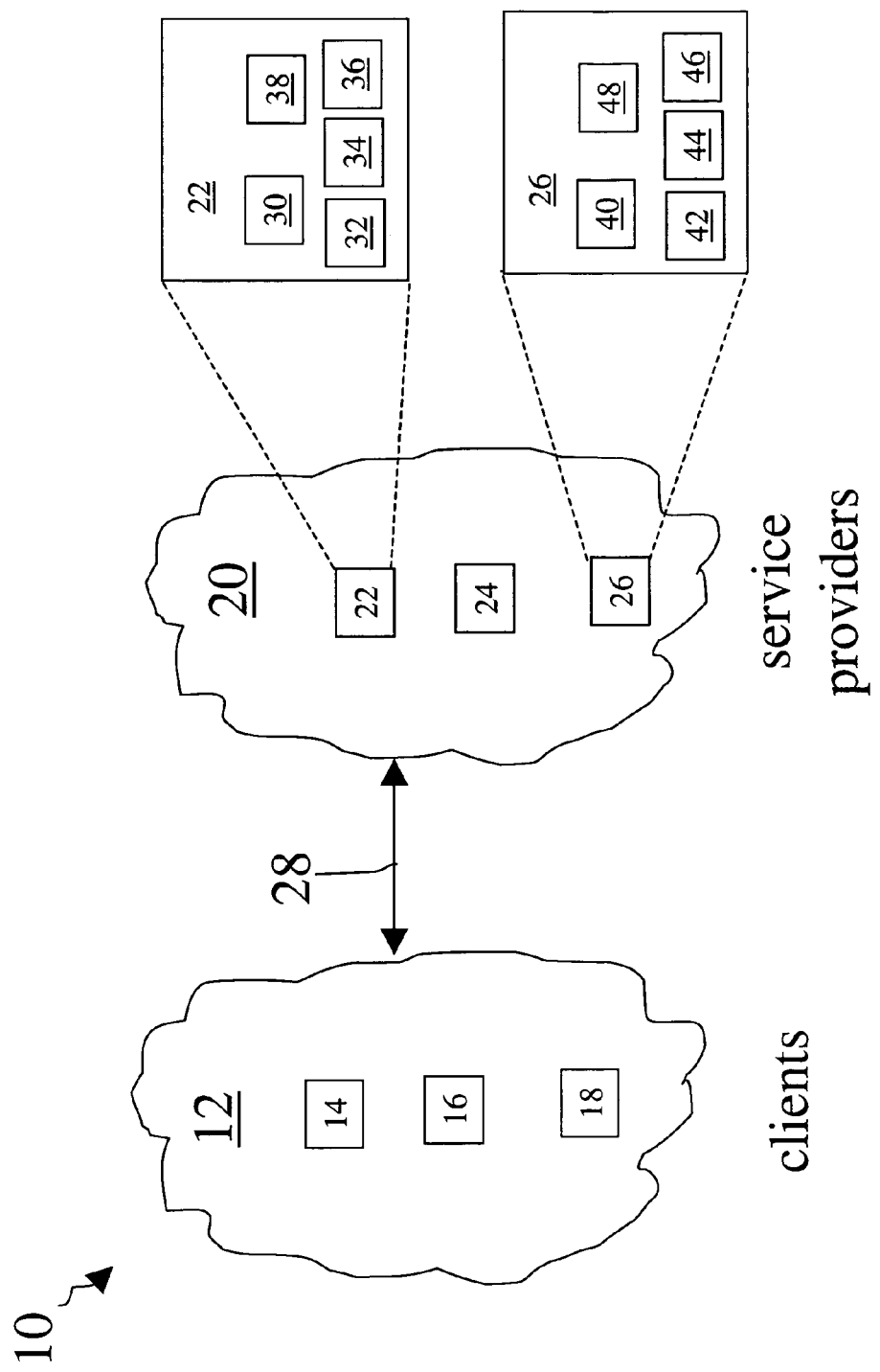
FIG. 1 is a block diagram of a services environment.

As shown in FIG. 1, a services environment 10 includes a set 12 of clients 14, 16, and 18. A set 20 of service providers 22, 24, 26 provide services to the set 12 of the clients 14, 16, and 18. Users use the clients 14, 16, and 18 to obtain the services provided by the service providers 22, 24, 26. The clients 14, 16, 18 communicate with the service providers 22, 24, 26 using a network 28. The service providers 22, 24, 26 each include a manager and a set of services. The manager is software that manages software providing the services. The service provider 22 includes a manager 30 and services 32, 34, 36. The service provider 26 includes a manager 40 and services 42, 44, 46.

The clients 14, 16, and 18 use services that satisfy service requirements by communicating with the service providers 22, 24, 26. Typical service requirements include maximum service response times, minimum availability, date of implementation or service version number and maximum cost in case the service is billable. These requirements can be matched against specifications of services based on usage history of the services, nominal specifications such as a date of implementation or service version number, and cost. For instance, a service with a specification that includes a specific date of implementation can match the requirements if the requirements include an earlier date of implementation.

In some examples, the service providers 22, 24, 26 provide these specifications in registries that are readable by the clients 14, 16, and 18. For example, the service provider 22 has registries 38 that specify the services 32, 34, 36 while the service provider 26 has registries 48 that specify the services 42, 44, 46.

These registries for services can for example be based on UDDI (Universal Description, Discovery, and Integration). UDDI is an Extensible Markup Language (XML)-based registry for businesses worldwide to list themselves on the Internet. UDDI streamlines online transactions by enabling companies to find one another on the Web and make their systems interoperable for e-commerce. UDDI is often compared to a telephone book's white, yellow, and green pages. UDDI allows businesses to list themselves by name, product, location, or the Web services they offer.

In some examples, the services 32, 34, 36 and the services 42, 44, 46 satisfy the same service requirements for the clients 14, 16, and 18. Thus, a particular service can be selected out of a set of similar services. In these examples, a client can be designed to use the "best" service using some optimal criteria. Typically, this "best" service can be selected based on criteria such as shortest service response time, highest availability, most recent implementation or the lowest cost. In some examples, the service for a given application of the client is selected after a manual search by an application developer. In these examples, the client uses the service considered to be best all of the time. In other examples, the "best" service is selected dynamically using a search every time the service is needed by the client. This search can be done using a services search engine.

To provide specifications in registries to enable searching for "best" services by the clients 14, 16, and 18, the managers (e.g., 30) for service providers 22, 24, 26 maintain persistent or transient memory that monitors the usage of the services (e.g., 32, 34, 36). Such usage information includes, over a period of time, how many clients called a service, how long was it used, how many errors occurred, how many sessions terminated abnormally, how much did it cost in average. This usage information can be quantified to include frequency of service calls, usage time, and frequency of errors as well as percentage of abnormal terminations. This usage information can be provided by the service providers 22, 24, 26 in registries (e.g., 38) that specify the services (e.g., 32, 34, 36). The usage information can also be provided dynamically by the service itself. This usage information can be used to determine, out of a set of services, which are the "best". In some examples, the "best" services are those services that were used the most often without errors.

Given this usage information about the services (e.g., 32, 34, 36), an application developer or a services search engine can search the registries (e.g., 38, 48) or call services directly of different service providers to find services that match a specification for services for particular applications of the clients 14, 16, and 18. This search matches nominal, minimum requirements for service response times, availability, date of implementation against nominal specifications in the registries, and cost. For all of the services that meet these minimum requirements, the search queries the service managers (e.g., 30, 40) to determine the usage information for each service and rank the service according to the usage information. This ranking can be used to determine which service to use in general or for a particular usage by a user. The ranking can be based on such criteria as maximum service response times, maximum availability, the most recent date of implementation or highest service version number, and lowest cost if the services are billable.

In the examples where an application developer manually does a search of services, the ranked list of services can be displayed to the application developer using a graphical user interface (GUI). This allows the application developer to easily choose the "best" service from the ranked list of services.

In some examples, the services (e.g., 32, 34, 36) can be transient. That is, the service providers 22, 24, 26 can install and run the services upon request of the clients 14, 16, 18. After a period of inactivity, the service providers 22, 24, 26 deinstall these services to allow resources to become available for other applications. One type of organization for service providers providing transient services is a grid computing environment. For grid computing environments, the usage information collected by each service provider includes, for transient services, how many times a specific service was generated and how long it was used until it was destroyed. This usage information for transient services also can include other information described previously such as frequency of service calls, usage time, and frequency of errors as well as percentage of abnormal terminations.

Figure 2:
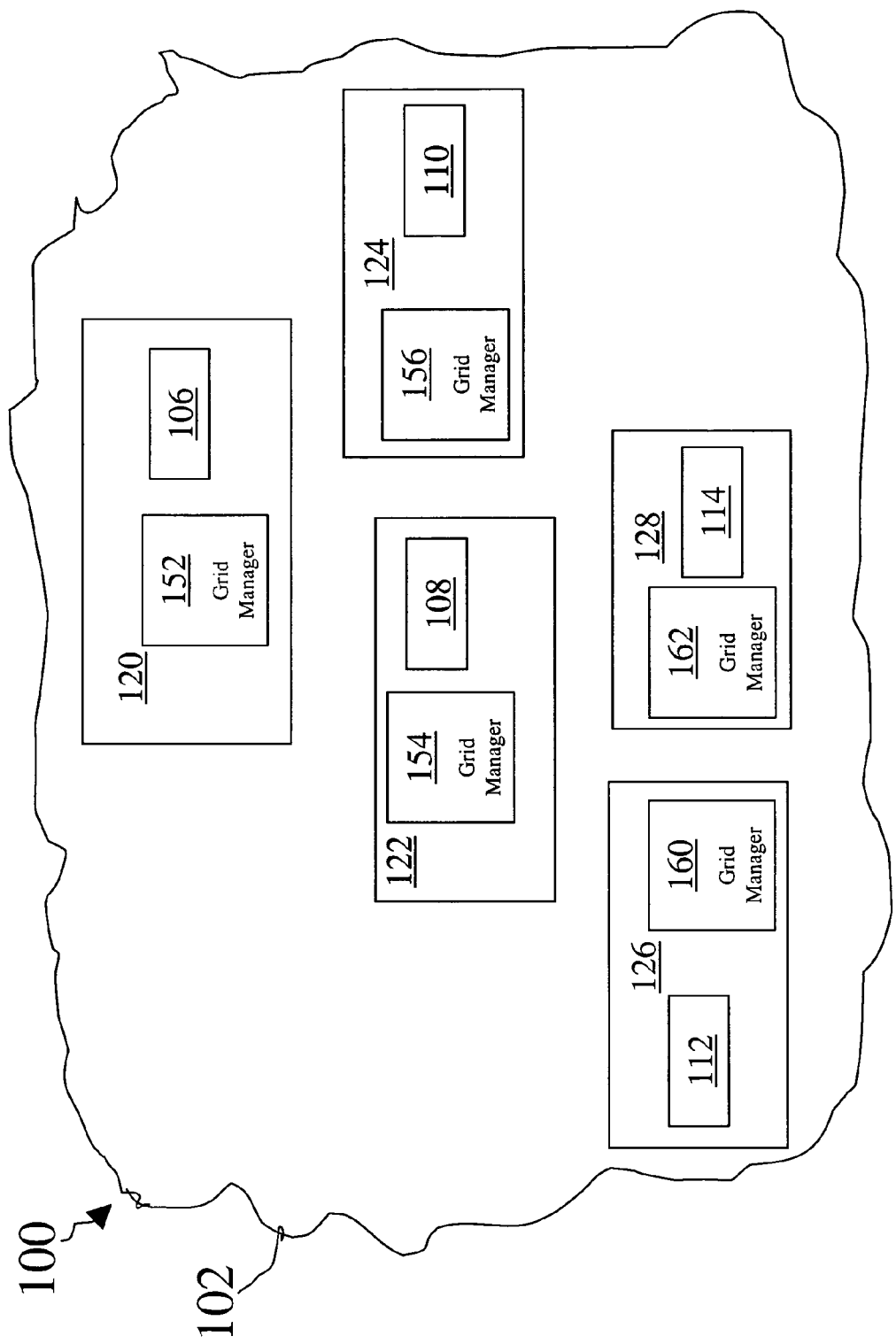
FIG. 2 is a block diagram of a grid computing environment.

As shown in FIG. 2, an example of a services environment 10 is a grid computing environment 100. Grid managers 152, 154, 156, 160, 162 in a grid computing environment 100 provide transient or intransient services for the clients 14, 16, or 18. The grid managers 152, 154, 156, 160, 162 can be arranged in a hierarchical, linear, or some other form of architecture to coordinate handling requests by the clients 14, 16, or 18. The grid computing environment 100 is a set of distributed computing resources that can individually be requested by clients 14, 16, 18 to perform computing or data retrieval tasks. The computational resources include computer devices 120, 122, 124, 126, 128. Grid managers 152, 154, 156, 160, 162 are resident in computer devices 120, 122, 124, 126, 128, respectively. The computer devices communicate using a network 102. The grid managers 152, 154, 156, and 160 communicate with the installed software services 106, 108, 110, 112, 114 to monitor the usage of each software service.

In one case, the grid managers 152, 154, 156, 160, 162 provide transient services, upon request, to the clients 14, 16, or 18 by installing, managing, and deinstalling the services on the computer devices 120, 122, 124, 126, 128, respectively. In the grid computing environment 100, the software services 106, 108, 110, 112, 114 are installed on the computer devices 120, 122, 124, 126, 128, respectively, and managed by the grid managers 152, 154, 156, 160, 162, respectively. The software services 106, 108, 110, 112, 114 are transient such that each software service may be installed, used, and deinstalled (or destroyed) multiple times by the same grid manager on the same computer device. The grid managers 152, 154, 156, 160, 162 monitor how often a specific service (e.g., 106) was installed and how long it was used until it was deinstalled (or destroyed). The grid managers 152, 154, 156, 160, 162 have persistent memory that stores statistical information of the results of this monitoring. Clients 14, 16, or 18 can specify the installation of services on particular computer devices based on this statistical information.

In other examples, the services 106, 108, 110, 112, 114 are not installed upon the request of a specific client (e.g., 14) but each software service is intransient and may perform some action for the clients 14, 16, or 18. In this case, the grid managers 152, 154, 156, 160, 162 monitor and collect statistical information on how many clients (e.g. 14, 16, or 18) called the intransient service, how long was it used, how many errors occurred, and how many sessions with the intransient service terminated abnormally. Clients 14, 16, or 18 can specify particular software services based on this statistical information.

Figure 3:
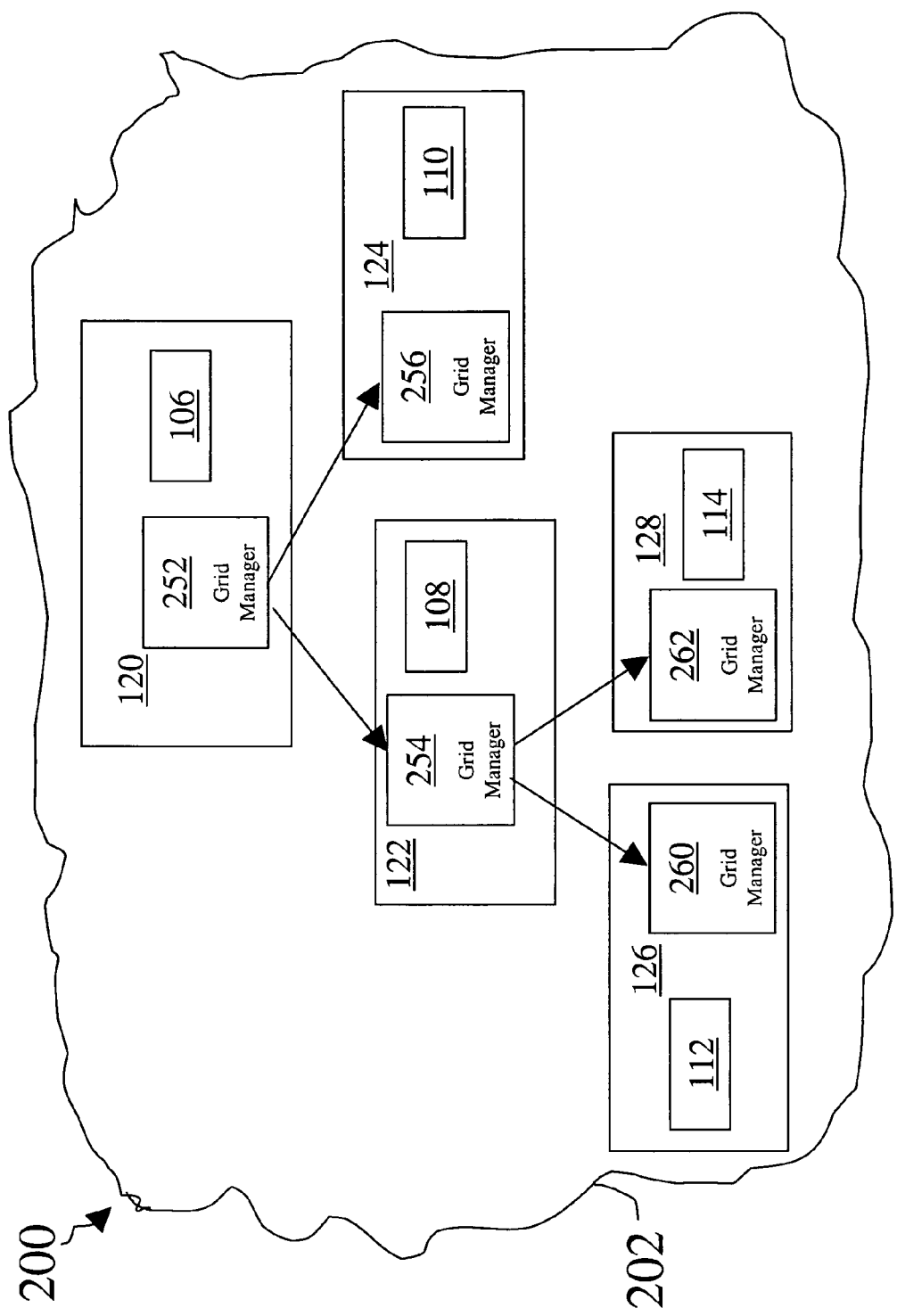
FIG. 3 is a block diagram of a grid computing environment with a hierarchical grid management architecture.

As shown in FIG. 3, an example of the grid computing environment 100 is a grid computing environment 200 having a hierarchical grid management architecture. In the grid computing environment 200, grid managers 252, 254, 256, 260, 262 are organized according to this hierarchical grid management architecture.

Within the grid computing environment 200, pairs of grid managers can have directional relations that classify one grid manager as superior to another grid manager. A grid manager can have more than one superior relations with other grid managers. For example, grid manager 252 has a superior relation with grid managers 254 and 256. A grid manager can also have more than one inferior relations with other grid managers. For example, through these hierarchical relations, the clients 12, 14, 16 do not need access to a list of the computer devices 120, 122, 124, 126, 128 in the network 202 to use the services or computational resources in the grid computing environment 200. The clients 14, 16, 18 are only required to have access to a network address of one computer device running a grid manager (e.g., computer device 120 running grid manager 252) and the grid manager 252 uses its relations with other grid managers running on other computer devices to provide the clients 14, 16, or 18 with access to other computer devices in the grid computing environment 200.

A grid manager (e.g., 252, 254, 256, 260, and 262) maintains a first list of all superior relations with other grid managers and a second list of all inferior relations with other grid managers. Each grid manager maintains an "always open" communications channel to all the grid managers in these lists over the network 202 using, for example, interfaces on transmission control protocol (TCP), hypertext transfer protocol (HTTP), and simple object access protocol (SOAP). These lists and corresponding communication channels can be modified, allowing a dynamic reconfiguration of the grid hierarchy while the services 106, 108, 110, 112, 114 are executing.

Figure 4:
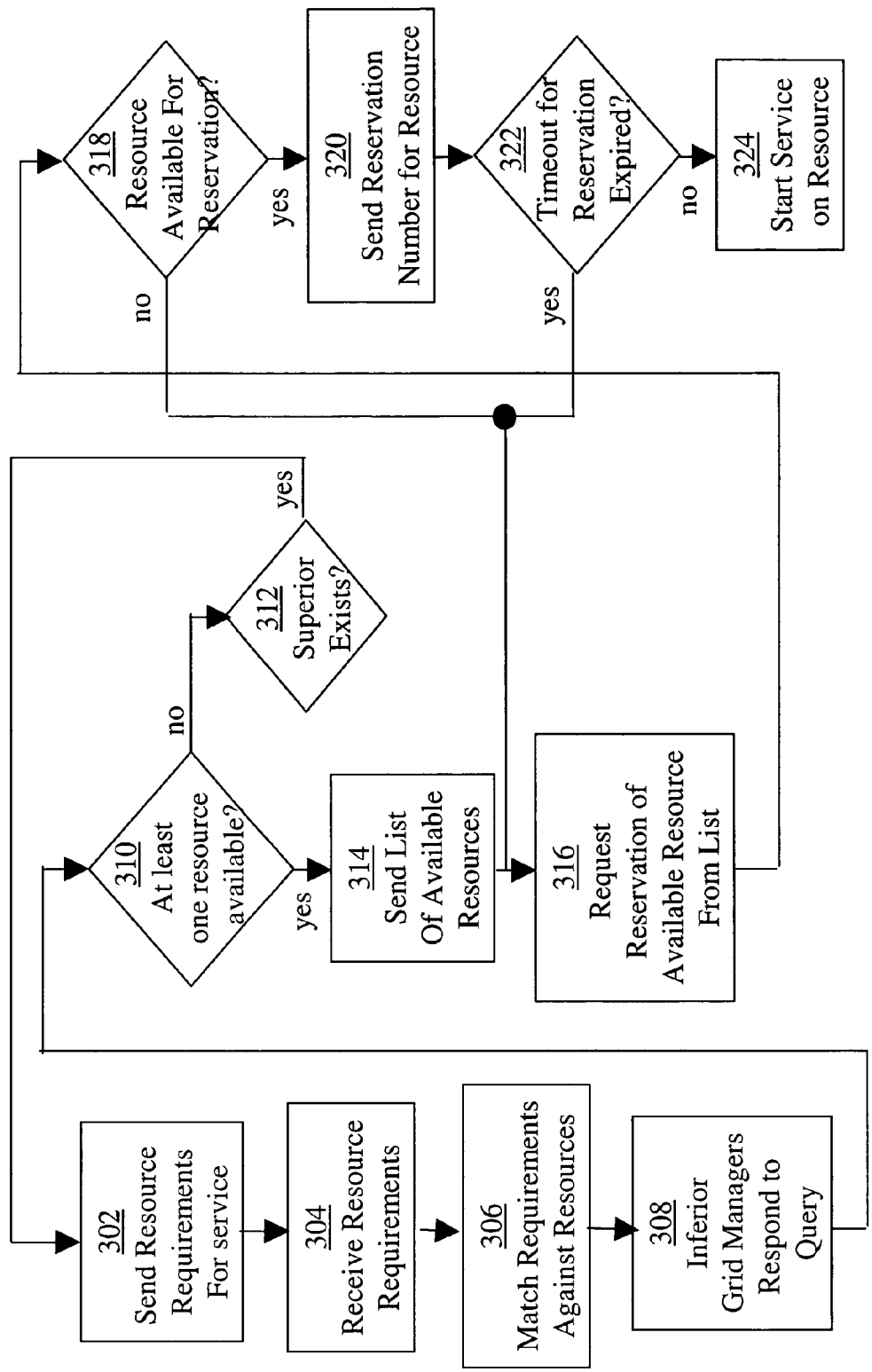
FIG. 4 is a flow diagram for discovering and reserving resources in the grid computing environment of FIG. 3.

As shown in FIG. 4, an application start process 300 allows clients (e.g., 14) to select a "best" grid manager to install a transient service (e.g., 106, 108, 110, 112, 114) in the network 202 before executing on a computer device (e.g. 120, 122, 124, 126, 128).

The process 300 includes the client 14 sending (302) requirements for the service 108 as part of a query to a grid manager (e.g., 254) to determine if there are available resources matching these requirements in the grid computing environment 200. For a given resource, these requirements include statistical performance metrics of the usage history of the service 108 previously installed on the resource. These requirements also include a minimum service version number for the service 108. The usage history for instantiations (having at least the minimum service version number) of the service 108 includes service response times, how many clients requested the service 108 to be installed on the resource, how long was the service used, how many errors occurred, and how many sessions of the service terminated abnormally on the resource. The statistical performance metrics include a mean and a standard deviation of a statistical distribution representing the past service response times, an average rate representing a number of clients requesting the service 108 over time, a mean and a standard deviation of a statistical distribution representing the amount of time the service 108 was used each instantiation, a mean and a standard deviation of a statistical distribution representing numbers of errors for usages of the service 108, a frequency of errors for instantiations of the service 108, and a percentage of sessions of the service 108 that terminated abnormally.

These requirements also specify nominal information pertaining to resources in a computer device (e.g., 122) such as required number of processors, required percentage of utilization for those processors, main memory, and network speed. The query can also include information to which hierarchy level (in the grid computing environment 300) the query should be propagated. The process 300 includes the grid manager 254 receiving (304) the requirements.

To respond to the query for the service 108 from the client 14, the process 300 includes the grid manager 254 matching (306) the requirements against information about the service 108 when it was previously installed on resources managed by the grid manager 254. This information includes, for each service version number of the service 108 that was installed on a resource, a mean and a standard deviation of a statistical distribution representing the past service response times, an average rate representing a number of clients requesting the service 108 over time, a mean and a standard deviation of a statistical distribution representing the amount of time the service 108 was used each instantiation, a mean and a standard deviation of a statistical distribution representing numbers of errors for usages of the service 108, a frequency of errors for instantiations of the service 108, and a percentage of sessions of the service 108 that terminated abnormally. This information also includes specifications of resources (known to the grid manager 254) that can be used to run the service 108. These resources include resources (e.g., a processor) in computer device 122 that are directly managed by grid manager 254. Resources directly managed by the grid manager 254 that are currently available and match the requirements are added to a resource-query list maintained by the grid manager 254.

Grid manager 254 also sends the query to grid managers 260 and 262 having inferior relations with grid manager 254. Process 300 includes grid managers 260 and 262 responding (308) to the query by sending to grid manager 254 lists of resources (e.g., processors on computer devices 126, 128) that meet the requested requirements and are available and known to grid managers 260 and 262, respectively. These resource-query lists of resources that are known to grid managers 260 and 262 can also include resources managed by grid managers (not shown) with inferior relations to grid managers 260 and 262. Grid manager 254 adds these resource-query lists of available resources from grid managers 260 and 262 to its resource-query list of available resources meeting the requested requirements. If process 300 determines (310) that there is at least one resource (e.g., a processor on computer device 122) meeting these requirements in this resource-query list, then grid manager 254 sends (314) this resource-query list to the client 14. Otherwise, if process 300 determines (312) that grid manager 254 has a relation with a superior grid manager (e.g., grid manager 252), grid manager 254 sends (302) the query for available resources to grid manager 252. In response to this query, grid manager 252 does not send a redundant query back to grid manager 254 having an inferior relation with grid manager 252.

Process 300 includes grid manager 254 sending (314) the list of available resources matching the requirements along with addresses of their corresponding grid managers in the network 202 that match the requirements. The client 14 selects a resource (e.g., a processor on computer device 122) from the list by searching through the specifications of usage history of the service 108 on the resources and ranking the list accordingly.

Process 300 includes the client 14 requesting (316) a reservation of the selected resource on computer device 122 to the grid manager 254 managing the resource on computer device 122. If the selected resource in computer device 122 is still available for reservation (318) and the reservation succeeds, grid manager 254 sends (320) a reservation number to the client 14. This reservation means that the client 14 is guaranteed and allocated the requested (selected) resource on the computer device 122 in the grid computing environment 200. The grid manager 254 handles queries for available resources from applications using independent processing threads of execution. Thus, the grid manager 254 uses a semaphore to ensure that the same resource (e.g., the processor on the computer device 122) is not assigned multiple reservation numbers for different applications simultaneously requesting the same resource.

If the grid manager 254 determines that the requested resource in computer device 122 is not available for reservation and the reservation fails, the client 14 selects a resource that is second ranked in the list and requests (316) the reservation of this second ranked resource. If the client 14 receives a registration number and a timeout measured from the sending of the registration number does not expire (322), the client 14 starts (324) service 108 on a processor resource in the computer device 122. Starting the service 108 is initiated by passing the reservation number and an application file to the grid manager 254 and then the grid manager 254 reads the application file to install and execute the service 108 on the computer device 122. Subsequently, the client 14 has remote access to the service 108.

The grid managers 252, 254, 256, 260, and 262 maintain the historical statistical information about services that the grid managers previously installed. For example, the grid manager 254 installs service 108 multiple times. After each instantiation of service 108 with a particular service version number, the grid manager 254 can update statistics for the service version number of the service 108. The statistics defines the historical performance of the service 108 with the particular service version number on the computing device 122. These statistics include mean and a standard deviation of a statistical distribution representing the past service response times, an average rate representing a number of clients requesting the service 108 over time, a mean and a standard deviation of a statistical distribution representing the amount of time the service 108 was used each instantiation, a mean and a standard deviation of a statistical distribution representing numbers of errors for usages of the service 108, a frequency of errors for instantiations of the service 108, and a percentage of sessions of the service 108 that terminated abnormally.

The grid manager 254 updates the statistics after an instantiation of the service 108 in response to a change in the number of service instantiations, a change in service response time, a change in service availability or a change in the service version number.

Other embodiments are within the scope of the following claims.

What is claimed is:

1. A method comprising:
   in a network, in each of a plurality of compute nodes, maintaining a local store of services, the local store of services including at least a service name, a service functionality and statistics defining a historical performance of the service on each compute node, wherein the statistics includes at least one of a number representing times the service has been instantiated, a number representing, for each instantiation of the service, how long the service was used until the service was destroyed, a number representing a service response time, a number representing an average availability statistic, a service version number, a cost for a service, and a number representing times the service had errors;
   receiving a request for a service from a client system; and
   compiling a list of compute nodes matching the service request to output the requested service, the list having service names ranked according to the service functionality and the statistics for each compute node.

2. The method of claim 1 in which the statistics comprise a number representing times the service has been instantiated.

3. The method of claim 1 in which the statistics comprise a number representing, for each instantiation of the service, how long the service was used until the service was destroyed.

4. The method of claim 1 in which the statistics comprise a number representing a service response time.

5. The method of claim 1 in which the statistics comprise a number representing an average availability statistic.

6. The method of claim 1 in which the statistics comprise a service version number.

7. The method of claim 1 in which the statistics comprise a cost for a service.

8. The method of claim 1 in which the statistics comprise a number representing times the service had errors.

9. The method of claim 1 in which the statistics comprise:
a number representing times the service has been instantiated;
a number representing, for each instantiation of the service, how long the service as used until the service was destroyed;
a number representing a service response time;
a number representing an average availability statistic;
a number representing times the service has errors; and
a service version number.

10. The method of claim 1 further comprising displaying the list on the client system.

11. The method of claim 10 in which displaying comprises a graphical user interface (GUI).

12. The method of claim 1 in which the list is ranked according to a frequency of service instantiation.

13. The method of claim 1 in which the list is ranked according to an average service response time.

14. The method of claim 1 in which the list is ranked according to a frequency of error.

15. A computer readable medium including instructions for performing, when executed by a processor, a method comprising:
in a network, in each of a plurality of compute nodes, maintaining a local store of services, the local store of services including at least a service name, a service functionality and statistics defining the historical performance of the service on each compute node, wherein the statistics includes at least one of a number representing times the service has been instantiated, a number representing, for each instantiation of the service, how long the service was destroyed, a number representing a service response time, a number representing an average availability statistic, a service version number, a cost for a service, and a number representing times the service had errors;
receiving a request for a service from a client system; and
compiling a list of compute nodes matching the service request to output the requested service, the list having service names ranked according to the statistics.

16. The product of claim 15 in which the statistics comprise:
a number representing times the service has been instantiated;
a number representing a service response time;
a number representing an average availability statistic; and
a service version number.

17. The product of claim 15 in which the list is ranked according to a frequency of service instantiation.

18. The product of claim 15 in which the list is ranked according to an average service response time.

19. The product of claim 15 in which the list is ranked according to cost.

20. A system comprising:
a client system residing in a network;
a plurality of compute nodes in the network, each one of the compute nodes maintaining a local store of services, the local store of services including at least a service name, a service functionality and statistics defining the historical performance of the service on each compute node, wherein the statistics includes at least one of a number representing times the service has been instantiated, a number representing, for each instantiation of the service, how long the service was used until the service was destroyed, a number representing a service response time, a number representing an average availability statistic, a service version number, a cost for a service, and a number representing times the service had errors;
means for receiving a request for a service from a client system; and
means for compiling a list of compute nodes matching the service request to output the requested service, the list having service names ranked according to the statistics.

21. The system of claim 20 in which the statistics comprises:
a number representing times the service has been instantiated;
a number representing a service response time;
a number representing an average availability statistic; and
a service version number.

22. The system of claim 20 in which the list is ranked according to a frequency of service instantiation.

23. The system of claim 20 in which the list is ranked according to an average service response time.

24. A method comprising:
generating a store of installed services in a computing device, the store including service names, a service functionalities and statistics defining the historical performance of the service on the computing device, the statistics comprising a number representing times the service has been instantiated, a number representing a service response time, a number representing an average availability statistic and a service version number; and
updating the statistics in response to a change in the number of service instantiations, a change in service response time, a change in service availability or a change in the service version number to output a requested service.

25. The method of claim 24 further comprising providing remote access to the store.

26. The method of claim 24 wherein the statistics further comprise a cost.

* * * * *